(12) United States Patent
Schubert et al.

(10) Patent No.: US 7,047,491 B2
(45) Date of Patent: May 16, 2006

(54) ELECTRONIC INFORMATION MANAGEMENT SYSTEM FOR ABSTRACTING AND REPORTING DOCUMENT INFORMATION

(76) Inventors: Daniel M. Schubert, 7026 Morganford Rd., Charlotte, NC (US) 28211; Scott T. Schubert, 19001 Casual Cay La., Cornelius, NC (US) 28031

( * ) Notice: Subject to any disclaimer, the term of this patent is extended or adjusted under 35 U.S.C. 154(b) by 723 days.

(21) Appl. No.: 09/730,455

(22) Filed: Dec. 5, 2000

(65) Prior Publication Data

US 2002/0069230 A1   Jun. 6, 2002

(51) Int. Cl.
G06F 17/00   (2006.01)
(52) U.S. Cl. .................. 715/530; 715/531; 705/4
(58) Field of Classification Search ............. 715/530, 715/531, 515, 511, 523, 522; 717/106, 105; 705/4; 706/50; 707/200
See application file for complete search history.

(56) References Cited

U.S. PATENT DOCUMENTS

| | | | | |
|---|---|---|---|---|
| 5,148,366 A | * | 9/1992 | Buchanan et al. | 715/531 |
| 5,446,653 A | * | 8/1995 | Miller et al. | 705/4 |
| 5,655,130 A | * | 8/1997 | Dodge et al. | 715/511 |
| 5,692,206 A | * | 11/1997 | Shirley et al. | 715/531 |
| 6,006,242 A | * | 12/1999 | Poole et al. | 715/531 |
| 6,237,011 B1 | * | 5/2001 | Ferguson et al. | 715/515 |
| 6,353,817 B1 | * | 3/2002 | Jacobs et al. | 706/50 |
| 6,424,982 B1 | * | 7/2002 | Vogel | 715/531 |
| 6,473,892 B1 | * | 10/2002 | Porter | 717/106 |
| 6,533,822 B1 | * | 3/2003 | Kupiec | 715/531 |

OTHER PUBLICATIONS

Author unknown,"LegalPoint 1.0a", copyright 1993-94 Teneron Corp., screen shots 1-8.*
Hill et al.,"The People's Law Dictionary, definition of Executed", referenced from web site law.com, http://dictionary.law.com/default2.asp?typed=executed&type=1, 1 page.*
Unknown author,"Real Estate Glossary", definition of an executed contract, downloaded from http://www.search4miamihomes.com/realestateglossary/E.html, p. 5 of 6.*
Wordnet Search—2.1 dictionary definition of the word abstractor, referenced from Google as http://wordnet.princeton.edu/perl/webwn 1 page.*

* cited by examiner

Primary Examiner—William Bashore
Assistant Examiner—James H Blackwell
(74) Attorney, Agent, or Firm—Schwartz Law Firm P.C.

(57) ABSTRACT

An electronic information management system abstracts and reports document information. The system utilizes a computer communicating with an electronic database. An input device is operatively connected to the computer for entering document information into the database. A plurality of electronic indexing tags are provided at predetermined locations within the stored document information and cooperate with a computer program to capture and retrieve selected portions of the document information. A display device is operatively connected to the computer for displaying the selected portions of document information apart from non-selected portions of document information.

16 Claims, 14 Drawing Sheets

LEASE INFORMATION

| | | |
|---|---|---|
| PROPERTY ID: AMC 12 | PROPERTY NAME: MAGNOLIA TOWERS | LEASE STATUS: ACT |
| LEASE ID: LASSEMA00 | DBA NAME: ASSET MANAGEMENT CONSULTANTS, INC. | LEASE TYPE: NET |
| TENANT ID: TASSEMA00 | LEGAL NAME: ASSET MANAGEMENT CONSULTANTS, INC. | |

SUITES: 12

PROJECT: AMC
REGION: EAST
PORTFOLIO: AMC 12

TOTAL BUILDING SF: 100,000
BILLABLE PARKING SPACES: 0
TENANT PRORATA SHARE: 2.45

LEASE TERM DATES

EXECUTION DATE: 11/24/98   RENT START DATE: 12/1/98
BEGIN DATE: 12/1/98   EXPIRATION DATE: 11/30/03
OCCUPANCY DATE: 12/1/98   VACATE DATE:

LEASE TERM IN MONTHS: 60

SUBLET FROM:
SUBLEASE LEVEL:

NAICS TYPE:
NAICS DESIGNATION:

- MINIMUM RENT
- RECURRING CHARGES
- PERCENTAGE RENT
- NON-FINANCIAL
- CONTACTS
- LEASE ISSUES
- RENEWAL OPTIONS
- SECURITY DEPOSITS
- LATE FEE/ESTOPPEL
- FULL SET

WHO MODIFIED ME?   INDEX LEASE   DATA SET: DANIEL

FIG. 1

SPACE INFORMATION

AMCPROLEASE - [PROJECT DATA ENTRY FORM]
FILE EDIT TOOLS HELP

[BACK] [NEW] [SAVE]

PROPERTY ID: AMC 12
LEASE ID: LASSEMA00

TYPE: OFFICE
FLOOR: 1
CLASS: NEW

SPACE NUMBER: 1
SUITE NUMBER: 12
SPACE START DATE:
SUITE END DATE:
SUBLET TO:
SUBLEASE START DATE:

USEABLE SQ FT: 6500
MIN. USEABLE: 6500
RENTABLE SQ FT: 6500
MIN. RENTABLE: 6500

SUBLEASE END DATE:

LANDLORD COSTS

LANDLORD IMPROVEMENT ALLOWANCE: $0.00
TENANT IMPROVEMENT EXCESS: $0.00
MOVING ALLOWANCES: $0.00

INSIDE COMMISSIONS AMOUNT: $0.00
OUTSIDE COMMISSIONS BROKER:
OUTSIDE COMMISSIONS AMOUNT: $0.00
OUTSIDE COMMISSIONS AGENT:

LANDLORD COSTS NOTES:

RECORD 1 OF 1

DATASET: DANIEL

FIG. 2

MINIMUM RENTAL

[ BACK ] [ SAVE ] [ CHANGE SUITE ]

PROPERTY ID: PT2SUM      SUITE NUMBER: 0170      BASE RENTAL TYPE: BRT ▷
LEASE ID: LTHRICA00      SQUARE FOOTAGE: 2182    PAYMENT TYPE: MONTHLY ▷

CURRENT RENTAL: $1,454.67    LEASE TERM TYPE: LEASE YEAR ▷    LEASE TERM DEFINED: ON LCD

FUTURE RENTAL ACTIVITY

| | EFF DATE | MONTHLY | ANNUAL | PER SQ. FT. |
|---|---|---|---|---|
| △ | 9/1/97 | $1,454.67 | $17,456.00 | $8.00 |
| * | | | | |

CONSUMER PRICE INDEX

CPI TABLE: ▷            FREQUENCY: ▷
CPI FLOOR: ▷            CPI CAP:
REVIEW TYPE:
COMMENT:

MIN. RENTAL NOTES:

FIG. 3

RECURRING CHARGES

| BACK | NEW | SAVE | CHANGE SUITE |

PROPERTY ID: P12SUM  SUITE NUMBER: 0170  CATEGORY: RRM
LEASE ID: LTHRICA00  SQUARE FOOTAGE: 2182  RECOVERY CALC. TYPE: PRO RATA

CURRENT AMOUNT: $130.98  BASE AMOUNT: $0.00  PAYMENT TYPE: MONTHLY
                         CAP AMOUNT: $0.00  CAP PERCENT: 0.00%

ADMIN FEE: SILENT
MGMT FEE: INCLUDED      CPI TABLE:
CAP X: SILENT           CPI FLOOR:         FREQUENCY:
MAJOR TENANTS: INCLUDED COMMENT:           CPI CAP:
DESCRIPTION OF                             REVIEW TYPE:
MAJOR T'S:

NOTES:

FUTURE ACTIVITY

| EFF DATE | MONTHLY | ANNUAL | PER SQ. FT. |
|---|---|---|---|
| △ | | | |

FIG. 4

| | |
|---|---|
| ADM | ADMIN FEE |
| AMF | ASSET MANAGEMENT FEE |
| ANT | ANTENNA/COMM |
| ATM | ATM |
| BRC | |
| CAM | COMMON AREA MAINTENANCE |
| CPI | CPI OFFICE |
| CRN | CONTRA-BASE RENT OFFICE |
| ECY | OFFICE OPEX (BASE YEAR) |
| ELC | ELECTRICAL REIMBURSEMENT |
| EMF | OFF. MGMT. FEE / BASE YEAR |
| EOT | OFF. TAX / BASE YEAR |
| GAR | GARBAGE |
| HVAC | |
| INS | INSURANCE |
| INT | INTEREST |
| JAN | JANITORIAL |
| KIO | CARTS/KIOSKS |
| MGM | MANAGEMENT FEE |
| MGT | MANAGEMENT FEE |
| MISC | MISC. |
| OTA | OVERTIME AIR CHARGE |
| OTH | OTHER REIMBURSEMENT |
| PKD | PARKING -DAILY |
| PKG | PARKING -MONTHLY |
| PKX | PARKING TAX-WASHINGTON STATE |
| REM | RECOVERY-OFFICE MGMT. FEE |
| REO | RECOVERY-OFFICE OPEX |
| RET | RECOVERY-OFFICE TAX |
| SGN | SIGNAGE |
| SIG | SIGNAGE/ADVERTISING |
| SPI | STORAGE CPI |
| SRT | SECURITY |
| STE | STEAM REIMBURSEMENT |
| SUB | SUBLEASE PROFITS |
| TAX | TAX |
| TIR | TI AMORTIZED RENT |
| UTL | UTILITIES |
| VEN | VENDING |
| WTR | WATER & SEWER |

FIG. 5

PERCENTAGE RENTAL

BACK | SAVE

PROPERTY ID: P12SUM  SUITE NUMBER: 0170  LEASE Y/E MONTH: ▷  LEASE YEAR DEFINED: ▷
LEASE ID: LITHRICA00  SQUARE FOOTAGE: 2182  PAID IN MONTH: ▷  BILLING CYCLE: ▷

PERCENT RENT TYPE: ▷
NATURAL BREAKPOINT: NO ▷  INTERIM REPORT DUE: ▷  WITHIN: ▷
PARTIAL YEAR INCL.: YES ▷  ANNUAL REPORT DUE WITHIN: ▷

| PERCENTAGE | ABOVE |
|---|---|
| 0.00% | $0.00 |

BREAKPOINT CHANGES

| EFFECTIVE DATE | AMOUNT |
|---|---|
| | |

% RENT NOTES:

CONTACTS FOR LEASE

BACK | NEW | SAVE

ORIGINAL VALUES: P12MON / LALERMEC0
PROPERTY ID: P12MON
LEASE ID: LALERMEC0

- ALL
- TENANT
- BILLING
- BROKER

CONTACT TYPE: BILLING
CONTACT NAME: AETNA MEDICAL CORPORATION
ADDRESS LINE ONE: 120 MONTGOMERY STREET
ADDRESS LINE TWO: SUITE 750
CITY: SAN FRANCISCO   STATE: CA   ZIP CODE: 94104
BILLING CONTACT: ACCOUNTS PAYABLE
PHONE NUMBER:
FAX NUMBER:
WEB ADDRESS:

RENEWAL OPTION DETAIL

| BACK | NEW | SAVE |

PROPERTY ID: P12MON
LEASE ID: LALUMRE00

STATUS: ACT
FUTURE CONDITION: MKT

INITIAL MIN. RENT:

TYPE: OPTION
NOTICE: 270 DAYS
TERM: 5 YEARS

OPTION START DATE: 3/17/02
OPTION END DATE: 3/16/07

EXERCISE START DATE: 3/17/01
EXERCISE END DATE: 6/20/01

LL NOTIFY START DATE:
RESPOND END DATE:

COMMENTS: ENDING RENTAL PSF
ENDING MONTHLY RENTAL- $21.34 PSF
MARKET RATE

OPTION RENTAL DATES:

| EFF DATE | MONTHLY | ANNUAL |
|---|---|---|
| △ | | |

ELECTRONIC INFORMATION MANAGEMENT SYSTEM FOR ABSTRACTING AND REPORTING DOCUMENT INFORMATION

TECHNICAL FIELD AND BACKGROUND OF INVENTION

This invention relates to an electronic information management system for abstracting and reporting document information. The invention has particular utility as an information management tool for lease contracts in the commercial real estate industry. In effort to alleviate the inherent inefficiencies of a traditional paper environment, the invention provides a globally-accessible electronic system applicable for contract abstracting, centralized data warehousing, customized information reporting, and electronic data conversion. These features allow users, even if in different locations, to access the same documents and data at the same time. And by offering these features within one software system, the invention eliminates the costly and unnecessary storing of redundant information across multiple platforms.

The invention contains electronic records with hundreds of fields used to house pertinent financial and non-financial information of a lease and its supporting documents, such as rent rolls, square footage reconciliations, and correspondence. More importantly, the invention stores all of this data in one central database, thereby avoiding unnecessary and costly storing of redundant information. In addition to storing abstracted information, the invention can create any type of report from this stored data. The result is an accurate, organized, manageable summary of the lease and its terms coupled with the ability to produce reports specifically tailored to the individual needs of each user.

Typical contract information abstracted, evaluated, and verified using the present invention includes (i) General Lease Information, e.g., property name, lease status, important dates suite information, contact/notice parties; (ii) Financial Information, e.g., rent schedules, recurring charges, percentage rental, renewal options, improvement allowances, commissions, security deposits, late fees; (iii) Non-Financial/Legal Information, e.g., tenant and landlord covenants, tenant and landlord restrictions, exclusive rights, use restrictions, co-tenancy requirements, laws and ordinances, insurance requirements, default specifications, damage specifications, marketing and promotions, holdover, kick out, relocation, radius restrictions; (iv) Operational Information, e.g., landlord and tenant maintenance, structural repairs and HVAC tracking & forecasting; and (v) Lease Issues, e.g., A unique field in which all inconsistencies and discrepancies found between the lease and its supporting documents are recorded. Common issues include rent roll miscalculations, incomplete subletting/assignment information, and Tenant name-change histories.

Data Warehousing

Inherent to any database application is the electronic storage of data. In commercial real estate, the due diligence process is often hampered by the dispersion of data, as information is generally stored in multiple programs or applications such as your accounting system and Microsoft Word or Excel. The invention alleviates this hindrance, as it stores all relevant financial and non-financial information in one centralized location. More importantly, the information can be accessed via the Internet by an unlimited number of people in different locations at the same time.

Electronic Storage of Lease Documents

The invention further enables the indexing of scanned or electronically stored lease documents contained in the system. Standard lease documents may include, for example, the lease itself, exhibits, amendments, estoppel certificates, insurance certificates, site plans, floor plans, aerial photographs, and the like. Once these documents are indexed, the user can then drill down to a specific desired document, or to an exact clause within a document, while simultaneously viewing a user-created summary of the indexed document or clause. This technology virtually eliminates the need and cost of duplicating lease files, and the time wasted searching for misplaced lease files, contracts, and other paper documents. By implementing the system of the present invention, the efficiencies realized over time are beyond measure.

Information Reporting

The invention is a relational database; i.e., it stores information in a multitude of individual, interactive tables. This significantly enhances reporting functionality as the software divides the masses of relevant data into readily identifiable and accessible tables of information.

The invention provides the unique ability to quickly and conveniently produce reports specifically tailored to the individual needs of each user—whether its a standard report, such as rent rolls, financial and non-financial lease summaries; or a property-level report, such as co-tenancy restrictions, HVAC, and tenant exclusive rights; or a custom report that caters exclusively to user requirements, such as options and recoveries information.

Data Conversion

The invention is designed to facilitate the importing and exporting of data in either a one-to-one base conversion or a multi-base conversion. By utilizing a relational database, the invention readily transfers data, regardless of where the data is currently stored or where it is to be moved. In a one-to-one base conversion, information currently housed in one database or location is imported into the present system and is then verified. This data is then manually entered into a new-user accounting system from reports produced by the invention, and in a format corresponding directly to that of the new-user accounting system. A multi-base conversion is applicable to information stored in a number of different programs, such as Microsoft Word, Microsoft Excel, Lotus, SQL, FoxPro, Paradox, and MRI. In this case, because the information would be more useful if accessible from a single program, the invention can import the data from these various locations and combine them all in one central database.

SUMMARY OF THE INVENTION

Therefore, it is an object of the invention to provide an electronic information management system applicable for abstracting and reporting document information in an efficient and convenient manner.

It is another object of the invention to provide an electronic information management system which is particularly applicable to property leases in the commercial real estate industry. The term "property" refers broadly to any real estate including, for example, a shopping center or office building.

It is another object of the invention to provide an electronic information management system which enables lease abstracting, centralized data warehousing, customized information reporting, and electronic data conversion.

It is another object of the invention to provide an electronic information management system which utilizes a computer. The term "computer" as used herein refers broadly to any device which receives, processes, or presents data.

It is another object of the invention to provide an electronic information management system which employs an indexing technique enabling a user to capture and view selected text of a lease document relating only to a desired subject of the lease in isolation from the remaining text of the lease document.

It is another object of the invention to provide an electronic information management system which enables complete, concise, and accurate summarization of lease clauses by direct reference to the actual lease language appearing simultaneously in a single computer screen.

It is another object of the invention to provide an electronic information management system which allows users to drill down into the electronically-stored lease document to retrieve and display select lease clauses within the lease document.

It is another object of the invention to provide an electronic information management system which includes a central database accessible by multiple users at the same time via a global communications network, such as the Internet.

It is another object of the invention to provide an electronic information management system which virtually eliminates the costly and unnecessary storing of redundant information across multiple platforms.

It is another object of the invention to provide an electronic information management system which creates an accurate, organized, and manageable summary of lease information together with the ability to produce reports specifically tailored to the individual needs of each user.

It is another object of the invention to provide an electronic information management system which enables a user to generate customized reports of information contained in a single lease, for multiple leases within a single property, and for multiple leases within multiple properties.

These and other objects of the present invention are achieved in the preferred embodiments disclosed below by providing an electronic information management system for abstracting and reporting document information. The system utilizes a computer which communicates with an electronic database. An input device is operatively connected to the computer for entering document information into the database. A plurality of electronic indexing tags are provided at predetermined locations within the stored document information to capture and retrieve selected portions of the document information. A display device is operatively connected to the computer for displaying the selected portions of document information in isolation separate from non-selected portions of document information.

According to another preferred embodiment of the invention, the document information includes text relating to multiple different subject matters, and the tags are located within the document information to capture and retrieve text relating to a desired one of the multiple different subject matters.

In another embodiment, the information management system is applicable for abstracting and reporting contract information. A section summary is prepared for each of the indexed contract sections. The summary is recorded in a field electronically linked to at least one of the indexing tags, such that a user viewing the section summary can drill down into the stored contract information to retrieve the contract section corresponding to the at least one electronically linked indexing tags. A display device is operatively connected to the computer for simultaneously displaying the section summary and the corresponding contract section.

According to another preferred embodiment of the invention, the database includes a plurality of contract abstracting fields adapted for being populated by the user based on data contained in the contract information.

According to yet another preferred embodiment of the invention, the contract information is a commercial real estate lease.

According to yet another preferred embodiment of the invention, the database includes a plurality of separate electronic records containing a corresponding plurality of commercial real estate leases stored in the database.

According to yet another preferred embodiment of the invention, the data recorded in the contract abstracting fields is selected from a data group consisting of tenant identification, landlord identification, lease term dates, leased space information, landlord costs, minimum rent, recurring charges, percentage rent, non-financial, contacts, lease issues, renewal options, security deposits, late fees, and estoppels.

According to yet another preferred embodiment of the invention, the system includes means for generating a customized report of data contained in selected ones of the contract abstracting fields.

According to yet another preferred embodiment of the invention, the section summary includes a copied portion of the tagged section of contract information.

According to yet another preferred embodiment of the invention, the electronic database is accessible by multiple users at the same time via a global communications network.

In another preferred embodiment, the invention is an electronic information management process for abstracting and reporting contract information. The process includes the first step of entering contract information into an electronic database. A plurality of electronic indexing tags are then inserted at predetermined locations within the stored contract information to identify respective sections of the contract information. A section summary is then prepared for each of the indexed contract sections. The section summary is recorded in a field of the database. The section summary field is electronically linked to at least one of the indexing tags, such that a user viewing the section summary can drill down into the stored contract information to retrieve the contract section corresponding to the at least one electronically linked indexing tag. The section summary and the corresponding contract section can then be simultaneously displayed to the user within the same screen of the display device.

According to another preferred embodiment of the invention, the process includes the step of populating a plurality of contract abstracting fields of the database based on data contained in the contract information.

According to yet another preferred embodiment of the invention, the process includes the step of creating a plurality of separate electronic records for a corresponding plurality of commercial real estate leases stored in the database.

According to yet another preferred embodiment of the invention, the process includes the step of generating a customized report of data contained in selected ones of the contract abstracting fields.

According to yet another preferred embodiment of the invention, the process includes the step of copying a portion of the tagged section of contract information into the section summary.

According to yet another preferred embodiment of the invention, the process includes the step of making the electronic database accessible to multiple users via a global communications network.

In still another preferred embodiment, the invention is a computer readable memory medium encoded with data representing a computer program adapted for use by a computer to direct the computer to execute a process for abstracting and reporting contract information. The memory medium includes means for entering contract information into an electronic database. Means are provided for inserting a plurality of electronic indexing tags at predetermined locations within the stored contract information to identify respective sections of the contract information. Means are also provided for electronically linking a section summary prepared for each of the indexed contract sections to at least one of the indexing tags, whereby a user viewing the section summary can drill down into the stored contract information to retrieve the contract section corresponding to the at least one electronically linked indexing tag. Means are also provided for simultaneously displaying the section summary and the corresponding contract section.

According to another preferred embodiment of the invention, the memory medium includes means for populating a plurality of contract abstracting fields of the database based on data contained in the contract information.

According to yet another preferred embodiment of the invention, the memory medium includes means for generating a customized report of data contained in selected ones of the contract abstracting fields.

According to yet another preferred embodiment of the invention, the memory medium includes means for creating a plurality of separate electronic records for the contract information stored in the database.

BRIEF DESCRIPTION OF THE DRAWINGS

Some of the objects of the invention have been set forth above. Other objects and advantages of the invention will appear as the description proceeds when taken in conjunction with the following drawings, in which:

FIG. 1 is a print out of the "Lease Information" screen for an electronic information management system according to one preferred embodiment of the invention;

FIG. 2 is a print out of the "Space Information" screen;

FIG. 3 is a print out of "Minimum Rental" screen;

FIG. 4 is a print out of the "Recurring Charges" screen;

FIG. 5 is a drop-down window listing different types of recurring charges;

FIG. 6 is a print out of the "Percentage Rental" screen;

FIG. 8 is a print out of the "Non-Financial (Legal) Information" screen, and displaying a separate window containing actual lease language obtained by drilling down into the stored lease document;

FIG. 9 is a print out of the "Non-Financial (Legal) Information" screen;

FIG. 10 is a print out of the "Contacts for Lease" screen;

FIG. 12 is a print out of the "Renewal Options Detail" screen;

FIG. 13 is a print out of the "Security Deposits" screen; and

Figure 14:
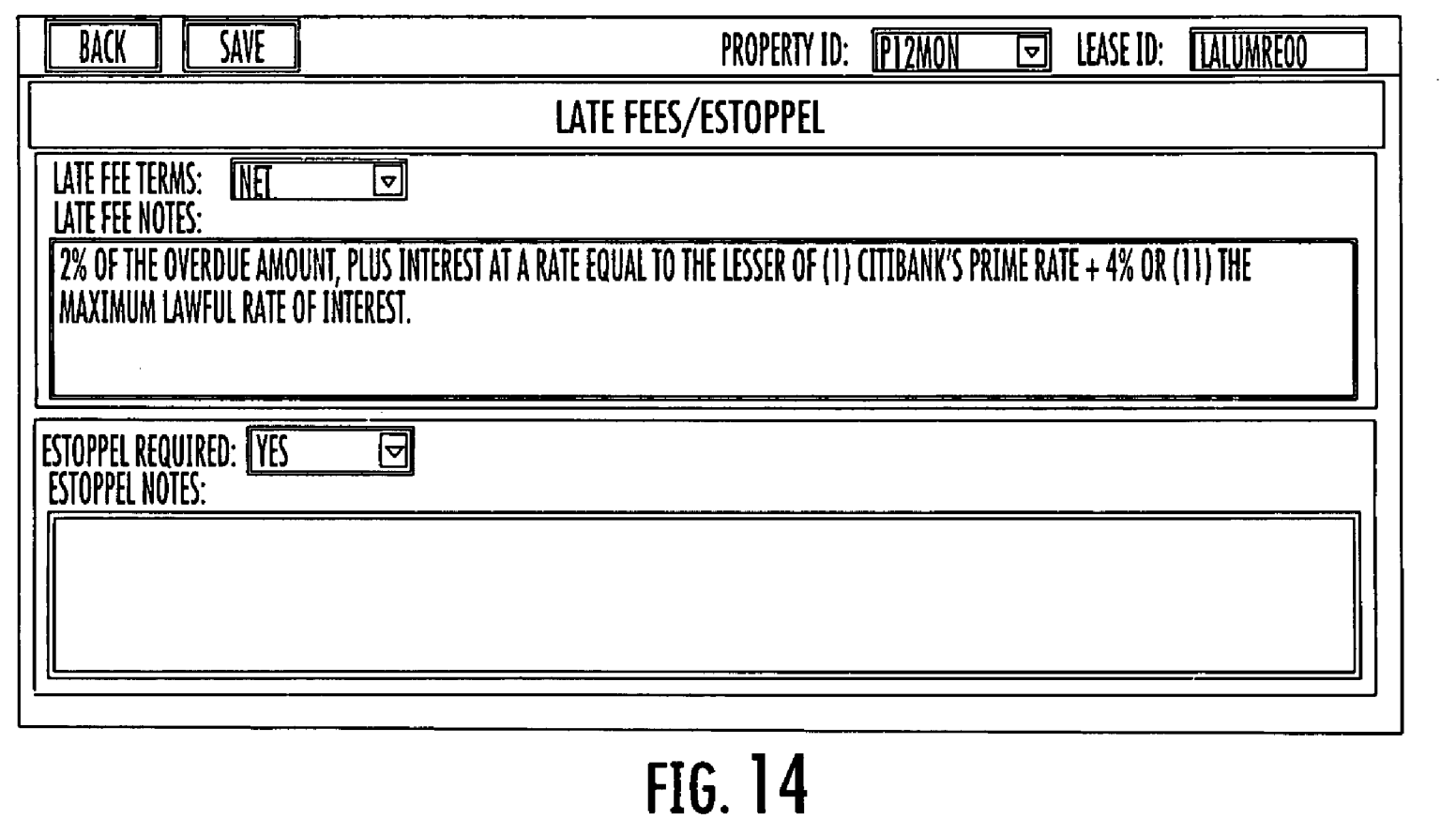

FIG. 14 is a print out of the "Late Fee/Estoppel" screen.

DESCRIPTION OF THE PREFERRED EMBODIMENT AND BEST MODE

Figure 7:
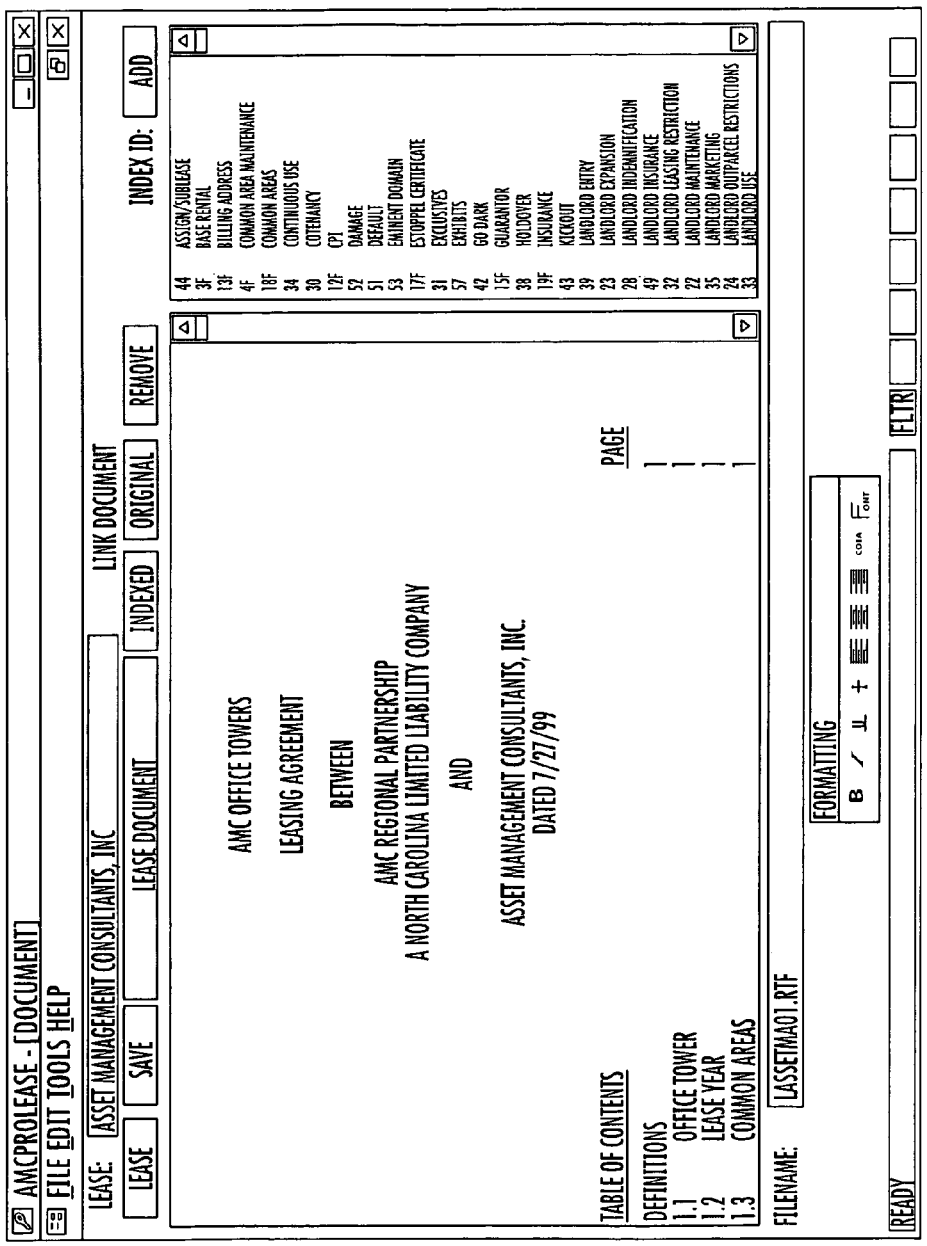
FIG. 7 is a print out of the "Lease Document" screen displaying a lease document to be indexed.

An electronic information management system for abstracting and reporting contract information (the "System") according to the present invention is described below with reference to the drawings, FIGS. 1–14. While the System has particular application to the commercial real estate industry, the principles employed can be applied to any other industry for purposes of convenient and efficient information management and reporting. The System utilizes a central database containing a multitude of individual lease records including data fields populated by lease abstractors. Multiple users access the System database via the Internet from a computer workstation including standard hardware equipment, such as a computer, keyboard, mouse, and display monitor, and suitable communication means, such as a modem or wireless connection. Each user has a personal login name and password for purposes of maintaining confidentiality while affording the user limited access to the System's central database.

General Lease Information

In the "Lease Information" screen shown in FIG. 1, the abstractor records characteristics of a given property and space based on information provided in the lease document. The Property ID field records an abbreviated or code name for the particular property in which the tenant's space is located. The complete full name of the property is recorded in the Property Name field. The Lease ID field records a predefined coding convention identifying the particular tenant using the name under which the tenant does business in the leased premises, i.e., its DBA Name.

According to one applicable coding convention, the Lease ID field contains a maximum of 12 alpha, numeric, or alphanumeric characters. The first character of the coding convention is the letter 'L'. The coding convention then takes the first four characters of the tenant's first name and the first two characters of the tenant's second name. The last two characters of the code are numeric and serve as tiebreakers. For example, if the tenant is Radio Shack, the Lease ID would be LRADISH01. When the tenant's first name is shorter than four characters, the tenant has no second name, or the tenant's second name is only one character, a backslash ('/') is used in place of each missing character in the Lease ID. Thus, if the tenant were operating a restaurant named J. Paul's, the Lease ID would be LJ///PA01.

The last two characters of the coding convention are used to differentiate between tenants with similar names or tenants with multiple leases within one property. The last two characters, or "tiebreakers", start with the number "01". Thus, if a tenant has a second lease within the property which would otherwise have the same Lease ID, then the last two characters of the coding convention for the second lease would be "02". Tiebreakers are also useful when two tenants within one property have similar, but not identical names (e.g., "Radio Shack" and "Radiators, Shocks and Lube Service"). In this case, one tenant will have a Lease ID of LRADISH01 and the other tenant will have a Lease ID of LRADISH02 in order to distinguish the two.

The Tenant ID is a coding convention used to identify the tenant's legal or corporate name. The Tenant ID coding convention consists of nine alphanumeric characters. According to this convention, the first character will always be a "T". The coding convention takes the first four characters of the tenant's first name and the first two characters of the tenant's second name. The last two characters of the code are numeric and serve as tiebreakers. For example, if the tenant is Tandy Corporation, then the Tenant ID would be TTANDCO01. When the tenant's first name is shorter than four characters, the tenant has no second name, or the tenant's second name is only one character, a backslash ('/') is used in place of each missing character in the Tenant ID. Thus, if the tenant's corporate name is Top Hat, Inc., then the Tenant ID would be TTOP/HA01.

The last two characters of the coding convention are used to differentiate between tenants with similar names or tenants with multiple leases within one property. The last two characters, or "tiebreakers", start with the number "01". Thus, if a tenant has a second lease within the property which would otherwise have the same Tenant ID, then the last two characters of the coding convention for the second lease would be "02". Tiebreakers are also useful when two tenants within one property have similar names and identical Tenant IDs (e.g., Hallmark Cards and Hallworth's Cafe). In this case, one tenant has a Tenant ID of THALLCA01 while the other has a Tenant ID of THALLCA02 in order to distinguish the two. If a tenant leases multiple spaces within one building but has executed a different lease for each space with the landlord, each different lease will still have the same Tenant ID. The tie-breaker is not applicable in this case since there is only one tenant competing for the particular Tenant ID. The Lease IDs will change, however, for each different space. If the tenant leases multiple spaces in the same building, but has only one lease for all multiple spaces, then the tenant will again only have one Tenant ID for all spaces. If the tenant's legal and DBA names are identical, such as McDonalds Corporation, then the tenant's Lease ID and Tenant ID will be the same.

The Legal Name field of the "Lease Information" screen identifies the tenant's formal corporate name. For Example, Radio Shack's DBA Name is "Radio Shack", but it's Legal Name is "Tandy Corporation". In some cases, the DBA and legal names may be identical.

The Lease Status field refers to the current legal relationship between the tenant and the landlord. Examples of lease categories within this field include those with are active, terminated, in holdover, awaiting rent commencement, in litigation, month-to-month, in default, or assigned. The Lease Type field refers to the specific type of lease that is being abstracted. For example, a "NET" lease is one that requires the tenant to pay 100% of its proportionate share of recoveries (such as CAM, taxes, and insurance) in addition to the tenant's obligation to pay base rent. A "Base Year" lease is one that requires the tenant to pay its proportionate share of all operating expenses that exceed a base amount. A "Gross Lease" is one that either includes recovery charges as part of rent or charges the tenant no recoveries at all. A "Sublease" is one under which the subtenant pays rent directly to the original landlord. Generally, however, the subtenant pays rent to the original tenant, who in turn, pays rent to the landlord.

The Project ID field identifies the name of the overall project. The Region ID field records the regional locale of the property. The Portfolio ID field records the name of the project portfolio. When the abstractor creates a new lease record and selects a Property ID for the record, as described above, each of these three fields are filled automatically.

The Total Building SF records the amount of gross leasable square footage in the entire property. Also, in some cases, the lease may guarantee to the tenant the use of a specific number of parking spaces in the property, but may further require that the tenant pay a monthly fee per space in return. The Billable Parking Spaces field refers to the number of parking spaces for which the tenant is charged a fee. If there are no billable parking spaces, the amount of rentable square footage contained in the tenant's leased premises will appear on any lease report containing the Billable Parking Spaces field.

The Tenant Pro Rata Share field defines the ratio that the leasable square footage of the tenant's premises bears to the total gross leasable square footage in the property. The tenant's pro rata share is typically defined in the lease as a percentage, and is used to determine the tenant's proportionate share of the expenses of maintaining, operating and insuring the property.

The Execution Date field records the date on which the original lease agreement was signed. The Begin Date field is the lease commencement date, or the date on which the lease term starts. The Occupancy Date field provides the actual date on which the tenant takes possession of the leased space. If no occupancy date is given, it is generally presumed to be the same as the Begin Date. The Rent Start Date records the date on which the tenant must first start paying rent. If the tenant is entitled to free rent or rent abatement, this field will reflect the abatement period. The Expiration Date is the date on which the lease term ends. The Vacate Date is the date on which the tenant physically moves out of the leased space. Since this information is generally unknown at the time of abstracting, this field is generally left blank. The Lease Term in Months field automatically calculates the number of months in the lease term.

The Sublet From field indicates whether the lease is a sublease. If the lease is not a sublease, this field is left blank. If the lease is a sublease, then the Sublease Level field records the number of times that the original tenant's premises has been subleased, prior to and inclusive of the execution of the current sublease. If the lease is a sublease from the original, primary tenant, then the sublease level would be "1". If the lease is a sublease from another sublessee (who is subleasing from the primary tenant), then the sublease level would be "2".

The North American Industry Classification System (NAICS) Type field refers to the general industry that characterizes the tenant's business. The NAICS Designation field refers to the specific type of business that the tenant intends to carry on in the leased premises within the property.

Space Information

Detailed space information for a given property is recorded in the fields of a "Space Information" screen shown in FIG. 2. To access the "Space Information" screen, the abstractor mouse-clicks on the Suite Edit button provided on the "Lease Information" screen discussed above. The space information fields are unique to each suite occupied by the tenant within the property. To create a new space record, the abstractor simply selects a suite number from the Suite Number drop-down box, and then fills in the fields applicable to the particular lease being abstracted. To create an additional space record, the abstractor mouse-clicks on the New button and repeats the above steps. Preferably, a counter keeps track of the total number of suites that the tenant is leasing within the property. To scroll through the different suites, the abstractor clicks on the direction buttons provided in the "Space Information" screen. To delete an individual suite record, the abstractor clicks on the "delete" button.

The Property ID and Lease ID fields in the "Space Information" screen are populated automatically when the abstractor selects the Suite Edit button in the "Lease Information" screen. The property and lease IDs in this screen are carried forward from the property and lease IDs of the "Lease Information" screen. The space Type field records the tenant's intended use of the particular space. Possible types include office, retail, and warehouse. The Floor field records the number of the floor on which the tenant's space is located. This field is populated automatically, as the floor number is tied to the suite number. The Class field records the specific class of the tenant's individual space. Examples of possible class types include EXP (Expansion), NEW (New), REL (Relocation), EM (Remeasured), REN (Renewal), and STT (Sublease to Tenant).

The Space Number field refers to the specific number of the tenant's space. For example, if the tenant is only leasing one space in the property, then the space number is "1". The Suite Number field identifies the suite address of the individual space in which the tenant's premises is located. The Space Start Date is the date on which the tenant first began leasing the particular space. The Space End Date is the date on which the tenant's lease for the particular space terminates. If the space has been subleased to another party, the Sublet to field records the lease ID of the subtenant. The Sublease Start Date is the date on which the sublease term begins. The Sublease End Date is the date on which the sublease term expires.

The square footage fields refer to the various amounts of square feet that the tenant's space occupies within the property. The square footage fields are populated automatically, but can be manually entered if the data pulled in is incorrect. The Useable Sq. Ft. field records the total amount of gross leasable square feet in the tenant's space. The Min. Useable field records the minimum amount of gross leasable square feet in the space. The Rentable Sq. Ft. field records the maximum amount of square feet within the space for which the tenant is required to pay rent. The Min. Rentable field records the minimum amount of square feet within the space for which the tenant is required to pay rent.

Certain landlord costs are also provided for in the "Space Information" screen. These fields are populated by the abstractor based on the costs (if any) that the landlord incurs as consideration for the tenant's execution of the lease. For example, if the landlord is required to contribute an amount towards the cost of construction of the tenant's improvements within the leased premises, the Landlord Improvement Allowance field records the amount of the landlord's contribution. If the lease gives the amount of the landlord improvement allowance as a per-square-foot charge, this amount is converted into a dollar amount for the entire space. If the cost of construction of the tenant's improvements exceeds the amount that the landlord is required to contribute, then this excess dollar amount is recorded in the Tenant Improvement Excess field. If the lease requires that the tenant change its location within the property (either prior to lease commencement or during the lease term), the Moving Allowance field records the amount (if any) that the landlord is required to reimburse the tenant for the costs incurred in moving between suites.

The Inside Commissions Amount field records the total dollar amount of the inside leasing commission. The Outside Commissions Broker field records the name of the outside broker. The Outside Commissions Amount field records the dollar amount of the outside leasing commission. The Outside Commissions Agent field records the name of the outside leasing agent for the lease. The Landlord Costs Notes field is reserved for language describing the landlord's obligation to pay any monies to the tenant. This field may also include any calculations made in deriving the landlord allowance or expense.

Lease Terms and Provisions

To begin abstracting specific lease terms and provisions, the abstractor returns to the "Lease Information" screen of FIG. 1 by selecting the Back button on the "Space Information" screen of FIG. 2. In the "Lease Information" screen, the abstractor clicks on the Minimum Rent button to display a "Minimum Rental" screen containing the fields shown in FIG. 3.

Minimum Rental

The minimum rent, or "base rent", represents the minimum amount of rent that the tenant must pay under the lease, exclusive of CAM, taxes, insurance and any other recurring charge. If the amount of base rent increases at any time in the future, this future base rent increase is called a "rent bump". The base rent generally bumps on either the anniversary of the lease commencement date, or on the anniversary of the first day of the month following the commencement date. If the tenant is leasing more than one suite from the landlord, a table will appear on the "Minimum Rental" screen listing each of the tenant's suites. By double-clicking on an individual suite, the abstractor can access the minimum rent fields for that particular suite. To switch to another suite, the abstractor simply clicks on the Change Suite button and re-selects from the list of suites appearing on the screen.

The Property ID, Lease ID, Suite Number, and Square Footage fields in the "Minimum Rental" screen are populated automatically based on information carried forward from the "Lease Information" and "Space Information" screens previously discussed. Thus, information recorded in the Property ID and Lease ID fields should match that recorded in the Property ID and Lease ID fields of the "Lease Information" screen. Information recorded in the Suite Number field should match that recorded in the Suite Number field of the "Space Information" screen. Information recorded in the Square Footage field should match that recorded in the Rentable Square Footage field of the "Space Information" screen.

The Base Rental Type field records the type of space for which the tenant is paying rent. Examples of base rental types include BRT (Base Rent Retail), wherein the tenant pays base rent on a retail space, BRN (Base Rent Office), wherein the tenant pays base rent on an office space, BRS (Base Rent Storage), wherein the tenant pays base rent on a storage space, and BRE (Base Rent Residential), wherein the tenant pays base rent on a residential unit. The Payment Type field refers to how often the tenant must pay minimum rent. The tenant generally pays minimum rent monthly, quarterly, semi-annually or annually. The Current Rental field records the amount of minimum rent that the tenant is paying as of the date of lease abstraction. The Lease Term Type refers to the manner in which tenant is required to pay minimum rent. Typically, the tenant pays minimum rent on either a lease, calendar, or fiscal year basis. The Lease Term Defined field refers to the determination of when the lease term starts and when the rent bumps occur. Rent bumps generally occur either on the anniversary of the lease commencement date (LCD) or on the first day of the month following the anniversary of the LCD.

The Future Rental Activity fields record the amounts of minimum rent that the tenant must pay and the respective dates on which each amount takes effect, starting with the initial amount of rent. In the first Effective Date field, the abstractor records the date on which the tenant first started paying minimum rent. All subsequent rent bump dates are recorded in the Effective Date fields below this. In the Monthly field, the abstractor records the amount of rent that the tenant must pay on a monthly basis (assuming that rent is paid monthly). The Annual and Per Square Foot fields are then computed automatically by the System.

In some cases, rather than listing specific future minimum rent amounts, the lease will tie future minimum rent increases (adjustments) to a change in the Consumer Price Index (CPI). In other words, minimum rent will increase by an amount equal to a fraction, the numerator of which is the CPI for the current adjustment date and the denominator of which is either a base CPI index or an adjusted CPI index. If minimum rent is to increase according to the CPI, the abstractor records this fact in the Minimum Rental Notes field and then populates the fields provided in the Consumer Price Index section of the "Minimum Rental" screen.

In the Consumer Price Index section, the CPI Table refers to the specific index used as the CPI. The CPI Floor field refers to a requirement that there be a minimum increase in the CPI adjustment of rent. The CPI floor usually takes the form of a percentage. The Review Type field refers to the type of base index used in determining how much base rent should increase. A CPI calculation with a fixed base index means that the denominator in the fraction used to determine by how much base rent should increase never changes. The denominator will always be the CPI for the month preceding the lease commencement date. A CPI calculation with an adjusted base index means that the denominator always changes. In this case, the denominator will be the CPI for the month preceding the start of the year prior to the adjustment date. The Frequency field refers to how often base rent increases according to the CPI. If the increase in base rent according to the CPI does not occur every year, but instead increases so that the CPI increase represents an increase over a prior amount rather than an increase over the immediately prior year, the frequency is referred to a being "over prior increase" (OPI). If the increase in base rent according to the CPI occurs every year, then the frequency is "over prior year" (OPY). If the increase in base rent according to the CPI is limited to a cumulative percentage amount, then the frequency is referred to as being "prior year cumulative/compound" (PYC). The CPI Cap field refers to a requirement that the CPI adjustment of rent not exceed a certain percentage or amount. The Comment field records the CPI adjustment month and the CPI adjustment dates. The CPI adjustment month is provided first, followed by a list of all of the Adjustment Dates. The Minimum Rental Notes field records any significant information about minimum rent, such as CPI adjustment or rent abatement. If the tenant's rent is inclusive of recovery charges such as CAM, taxes and insurance, this fact is also indicated in the Notes field.

Recurring Charges

After populating the minimum rental fields, the abstractor selects the Back button to return to the "Lease Information" screen. From this screen, the abstractor mouse-clicks on the Recurring Charges button to access the "Recurring Charges" screen shown in FIG. 4. This screen contains multiple recoveries fields, discussed below, for recording charges that the tenant must pay to the landlord on a repeating basis as reimbursement to the landlord for the cost of maintaining, operating and insuring the property. Common examples of recurring charges include CAM (common area maintenance), insurance, real estate taxes, and operating expenses.

If the tenant is leasing more than one suite from the landlord, a table will appear in the "Recurring Charges" screen listing each of the tenant's suites. By double-clicking on an individual suite, the abstractor can access the recoveries fields for that particular suite. To switch to another suite, the abstractor clicks on the Change Suite button and selects another suite from the list displayed on the screen.

The Property ID, Lease ID, Suite Number, and Square Footage fields are automatically populated upon accessing the "Recurring Charges" screen based on information carried forward from the "Lease Information" and "Space Information" screens previously discussed. Thus, information recorded in the Property ID and Lease ID fields should match that recorded in the Property ID and Lease ID fields of the "Lease Information" screen. Information recorded in the Suite Number field should match that recorded in the Suite Number field of the "Space Information" screen. Information recorded in the Square Footage field should match that recorded in the Rentable Square Footage field of the "Space Information" screen.

The Category field records the specific type of recurring charges that the tenant must pay. Examples of recurring charges types are indicated in FIG. 5.

The Recovery Calculation Type field refers to the particular recovery charge. This field records the portion of the landlord's expenses that must be paid by the tenant. The tenant typically pays a pro rata share of these expenses. Some leases require the tenant to pay a capped pro rata share of the recurring charge. In this case, the tenant generally pays the entire amount of its proportionate share of the recurring charge with an annual increase in the tenant's proportionate share being capped at a specific amount. Alternatively, the tenant's proportionate share itself may be capped at a specific amount. The cap amount is recorded in the Cap Amount field, or, if applicable, the percentage of the cap is recorded in the Cap Percent field. In other cases, the recurring charge is defined by a portion of the recurring expense that exceeds a predetermined base year amount. This base year amount (if known) is recorded in the Base Amount field, and the base year recorded in the Notes field. The Payment Type field records how often the tenant must pay its recurring charge. Payments are generally made either monthly, quarterly, semi-annually, or annually.

The Current Amount field records the amount of the recovery charge that the tenant is paying as of the date of abstraction. Three significant expenses are generally included in the tenant's recurring charges—an administrative fee, a management fee, and capital expenditures. These charges are recorded by the abstractor in the Admin Fee, Mgmt Fee, and Cap X fields, respectively.

The "major tenants" of the property are generally defined in the lease as those tenants leasing space in excess of a specified number of square feet. The Major Tenants fields refer to the determination of the tenant's pro rata share of the recurring charges. The lease generally defines the tenant's pro rata share using a fraction, the numerator of which is the number of square feet in the tenant's leased premises, and the denominator of which is the total gross leasable (or leased) space in the property. This fraction either includes or excludes the property's major tenants. If the lease includes in the denominator all leasable (or leased) space in the property, then major tenants are included. If the lease excludes from the denominator major tenants, then major tenants would are excluded from the recurring charge. Any information that further distinguishes the major tenants is recorded in the Description of Major Tenants field.

In some cases, rather than listing specific future recurring charge amounts, the lease will tie future recurring charge increases to the change in the Consumer Price Index (CPI). If the recurring charge is to increase according to the CPI, the abstractor notes this fact in the Notes field and then populates the applicable CPI fields. The CPI Table field records the specific index used as the CPI. The CPI Floor records a requirement that there be a minimum increase in the CPI adjustment of the recurring charge. The CPI floor is generally a percentage. The Review Type field records the type of base index used to determine the amount of recurring charge increase. The Comment field is reserved for the CPI adjustment index month and a list of the CPI Adjustment dates. The CPI adjustment index month is provided first, followed by a list of all of the adjustment dates, e.g., "JAN;09/15/99,00,01,02,03,04". In this example, January is the CPI adjustment month, Sep. 15, 1999 is the adjustment date, and the adjustment years are 2000, 2001, 2002, 2003, and 2004.

The Future Activity section of the "Recurring Charges" screen records the initial amount of and any future increases in the tenant's recurring charge. The Effective Date field records the dates on which each monthly charge takes effect. The Monthly field records the monthly amount of such charge. The Annual field represents the annual amount of the tenant's recurring charge. The Per Square Foot field represents the amount of the recurring charge per square foot of the tenant's leased premises. Both the per square foot and annual amounts of the recurring charge are computed automatically after recording the monthly amount (if known). The Notes field records any information unique and important to each recovery charge, such as the base year for base year charges, or whether gross-ups are used in the calculation of the tenant's recurring charge.

Percentage Rental

In some leases, the tenant is required to pay the landlord a specific percentage of any gross sales that exceed a certain sales breakpoint. This requirement that the tenant pay "percentage rent" is typically found in retail leases. To access the "Percentage Rental" screen shown in FIG. 6, the abstractor clicks on the Percentage Rent button provided in the "Lease Information" screen. If the tenant is leasing more than one suite from the landlord, a table will appear on the screen listing each of the tenant's suites. By double-clicking on an individual suite, the abstractor can access the percentage rental fields for that particular suite.

The Property ID, Lease ID, Suite Number, and Square Footage fields are populated automatically based on information carried forward from the "Lease Information" and "Space Information" screens previously discussed. Thus, information recorded in the Property ID and Lease ID fields should match that recorded in the Property ID and Lease ID fields of the "Lease Information" screen. Information recorded in the Suite Number field should match that recorded in the Suite Number field of the "Space Information" screen. Information recorded in the Square Footage field should match that recorded in the Rentable Square Footage field of the "Space Information" screen.

The Lease Y/E Month field records the month in which each lease year during the lease term ends. The lease year end month is especially important if the tenant is paying percentage rent annually, for it represents the end of the percentage rent lease year and the time when the tenant has to take stock of the gross sales for the entire lease year and report the same to the landlord. The amount of percentage rent that the tenant is required to pay to the landlord depends on the tenant's report of gross sales.

The Paid In Month field records the month in which the tenant's payment of percentage rent is due. While the lease year may end in October, for example, the tenant may not be required to pay percentage rent for the preceding year until some future date indicated in the lease. The lease generally grants the tenant a specified amount of time within which to prepare and deliver to the landlord a report of gross sales for the preceding pay period. If the tenant pays percentage rent annually, then the tenant must generally prepare and deliver to the landlord an annual gross sales report. If the tenant pays percentage rent quarterly, then the tenant must generally prepare and deliver quarterly reports of gross sales. The tenant pays percentage rent based upon the gross sales in these reports.

The Lease Year Defined field records the period for which percentage rent must be paid under to the lease. Percentage rent is typically based on either a calendar year, lease year, or fiscal year. A lease year for percentage rent purposes is not necessarily equivalent to the year of the lease for lease term purposes. For example, if the lease has a term of 10 years, and the lease commencement date is Jun. 1, 1995, then the first year in the lease term will begin on Jun. 1, 1995, the second year in the lease term will begin on Jun. 1, 1996, and so on. However, the percentage rent lease year may not follow the same pattern. If the lease year is defined as a calendar year, for example, the first lease year will commence on Jun. 1, 1995 and will end on Dec. 31, 1995, the second lease year will commence on Jan. 1, 1996 and will end on Dec. 31, 1995, and so on. Thus, while there are 10 years in the lease term (Jun. 1, 1995–May 30, 2005), there are eleven lease years—the first and last lease years being partial lease years. The Billing Cycle field records how often the tenant is required to pay percentage rent. Percentage rent is typically paid either monthly, quarterly, semi-annually or annually. The Percentage Rent Type field indicates whether the tenant is paying either percentage rent in lieu of base rent, or overage rental.

The Natural Breakpoint field records whether the percentage rent breakpoint is natural or not natural. A "breakpoint" is the threshold amount or dividing line of gross retail sales above which the tenant is required to pay percentage rent. A breakpoint that derives its value from, and is tied to, annual base rent is considered natural. If the breakpoint is natural, the abstractor records "yes" in the Natural Breakpoint field, performs the natural breakpoint calculation for each increase in annual base rent, and then records the results the Breakpoint Changes fields. For example, if the tenant is paying $10,000 in fixed annual rent, 3% in percentage rent, and the breakpoint is natural, then the breakpoint is calculated by dividing annual rent by the percentage ($10,000 divided by 0.03) to yield a breakpoint of $333,333.33. In this case, the tenant must pay the landlord every lease year 3% of any gross sales that exceed $333,333.33 per annum.

If the first or last year in a lease is a less than a full lease year, the Partial Lease Year Incl. field records whether this partial lease year is included in or excluded from the first full lease year.

The Interim Report Due and Annual Report Due fields refer to how often the tenant must report on gross sales made during each lease year, and how many days the tenant must prepare the report after the end of each reporting period. In most cases, the tenant is not only required to prepare an annual gross sales report, but is also often required to prepare an interim report of gross sales, usually quarterly or monthly. If an annual report is required, the abstractor records in the Annual Report Due Within field the number of days after the end of each lease year before which the tenant must report annual gross sales. If interim reports of gross sales are required, the abstractor records in the Interim Report Due field how often such reports are due, and in the Within field, the number of days after the end of each interim period before which such reports must be submitted.

If the percentage rent breakpoints change at any time in the future, the abstractor records the date of such change in the Effective Date field and the amount of such change in the Amount field, starting with the initial breakpoint amount. The bump dates for the breakpoints depend on whether percentage rent is paid on a lease year, calendar year, or fiscal year basis. If percentage rent is paid on a calendar year basis, then the breakpoints bump on 1/1. If percentage rent is paid on a lease year basis, then the breakpoints generally bump either on the anniversary of the commencement date or on the anniversary of the first day of the month following the commencement date. If percentage rent is paid on a fiscal year basis, then the breakpoints bump on the first day of every fiscal year, as defined in the lease.

In the Percentage and Above fields, the abstractor records the current percentage and current breakpoint that the tenant is required to pay. In some cases, the tenant is required to pay different percentages on different breakpoints. For example, the lease may require the tenant to pay percentage rent on 4% of all gross sales above $1 million, 3% of all gross sales above $1.5 million, and 2% of all gross sales over $2 million. Any other significant information pertaining to percentage rent is recorded in the % Rent Notes field.

Indexing the Lease Document

At this point, before continuing with the lease abstracting process, the abstractor indexes the lease document as described below. From the "Lease Information" screen, the abstractor selects the Index Lease button to electronically enter the entire lease document into the System. While this step may be performed at any stage of the lease abstracting process, the non-financial clauses of the lease (discussed below) are generally abstracted more efficiently and accurately when the lease document is first electronically indexed.

The lease document is electronically entered into the System's central database in a "Lease Document" screen shown in FIG. 7. The lease document may be entered either manually from the abstractor's computer workstation, by scanning, or by any other suitable input means. Once in the System, the lease document is saved in a specified format, such as a Rich Text Format (".rtf"). The formatted lease document is then attached to a corresponding lease record using the Indexed button on the "Lease Document" screen. The Filename field identifies the electronic lease record for the current lease document being indexed.

Each tag includes an Index ID code identifying a particular subject matter or lease clause category. For example, Index ID code "44" identifies the "Assign/Sublease" clause of the lease document shown in FIGS. 7 and 8. A computer program is employed to electronically link the tagged sections of the lease document to respective clause categories in the Index ID field. Thus, by selecting the "Premises" clause in the Type field, the System automatically displays this lease category in the Notes field. Then, by double-clicking within the Notes field, the System captures the tagged lease clause linked to the "Premises" category for the given lease document, and displays the entire text of this clause within a separate window appearing simultaneously within the Notes field. This feature of the System is referred to as drilling down into the document.

In a further application, a single character tag may be inserted at several different locations throughout different sections of the lease document. For example, relevant text relating to the issue of property insurance may be buried within multiple sections of a particular lease document. In this case, the abstractor can tag each relevant phrase, sentence, or sentences relating to property insurance occurring throughout the entire text of the document. Then, by selecting the "Property Insurance" category in the Type field and double-clicking in the Notes field, as previously described, the System will interrogate the lease document employing the property insurance character tag and computer program to capture and display all tagged sections of the document relating to this subject matter. The result is a concatenation of document text relating to a specific subject matter and displayed to the user in isolation, separate and apart from all other text of the lease document unrelated to this subject matter.

The System employs basic computer programming to capture and display all tagged sections and electronically link the tagged sections to respective clause categories in the Index ID field. In a windows or web-based environment, XML or other suitable markup language is used to capture, display, and link the tagged sections to their corresponding clause categories.

Non-Financial

Figure 8:
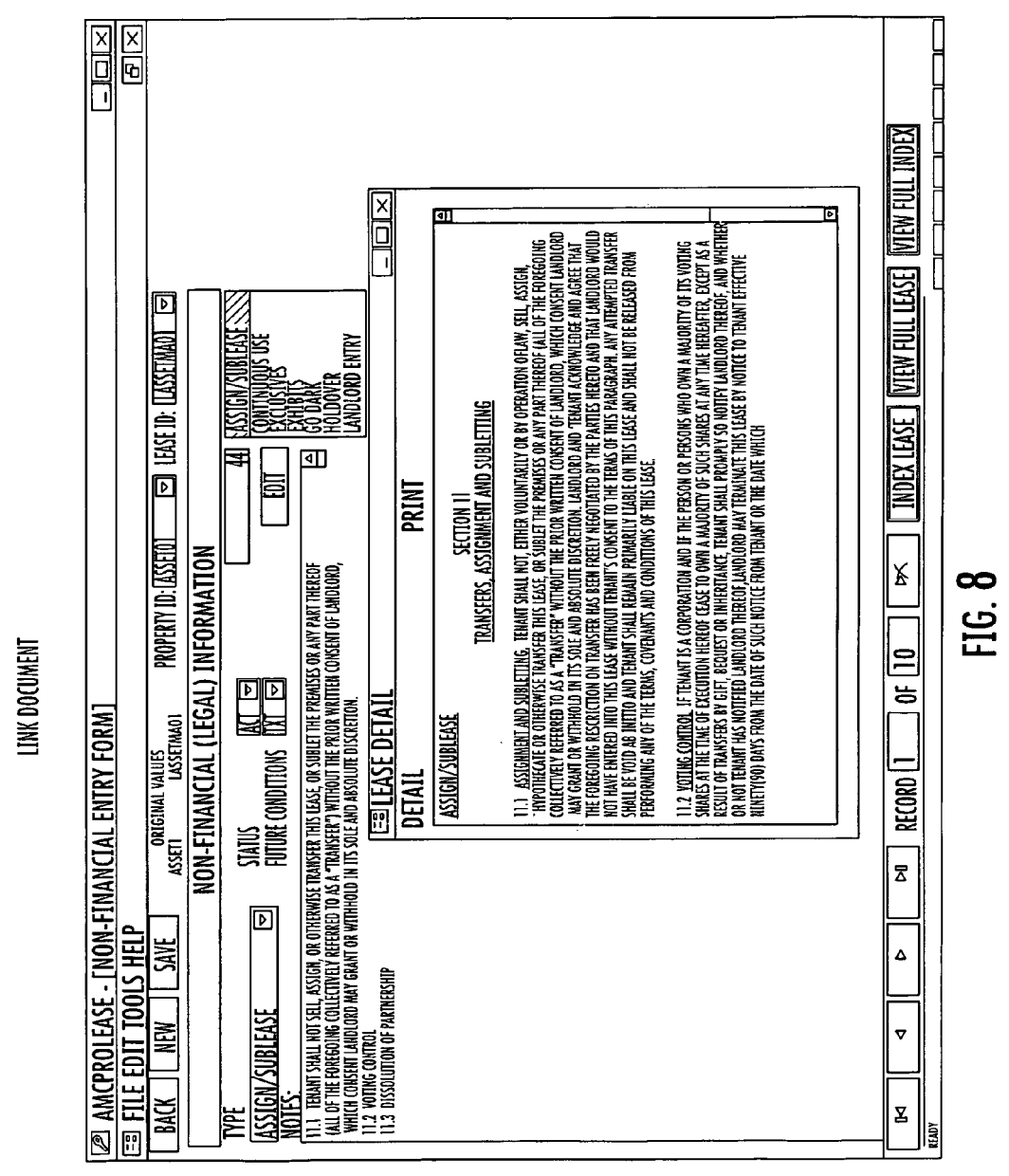
Figure 9:
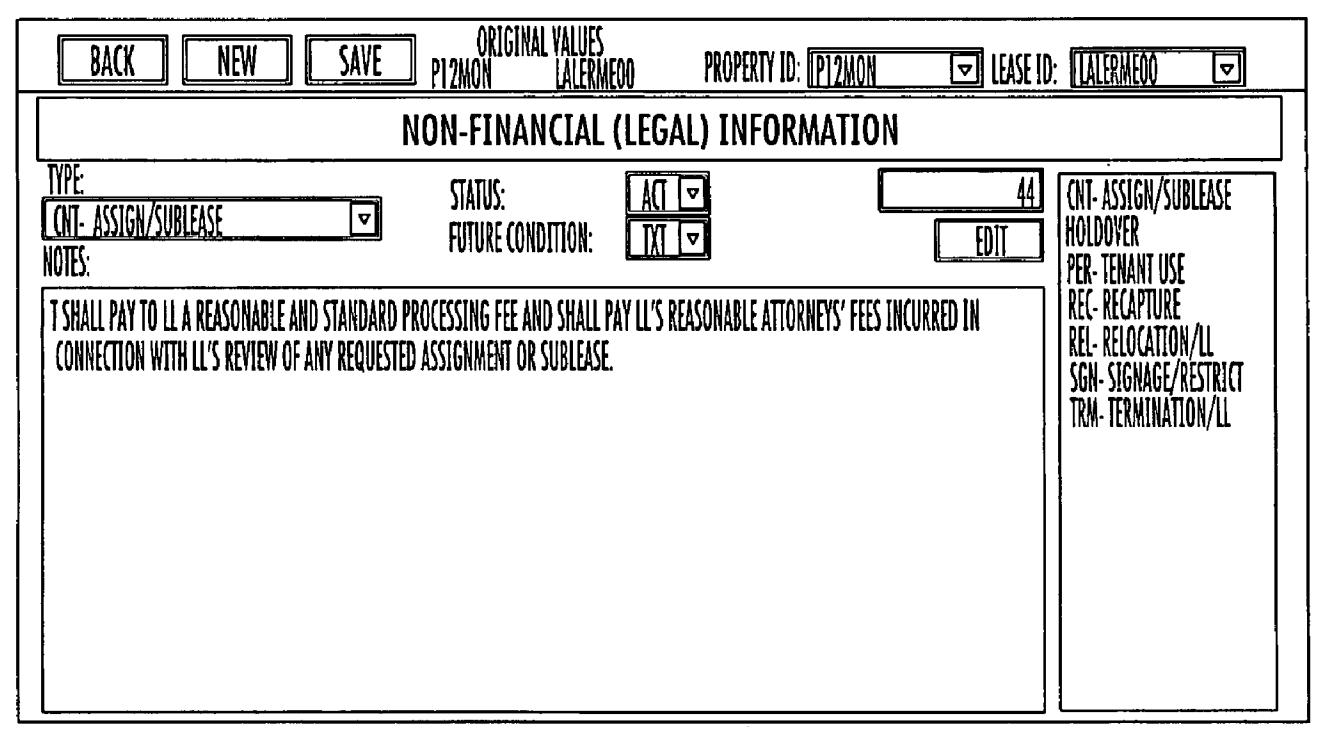

After indexing the lease document, as described above, the abstractor clicks on the Non-Financial button in the "Lease Information" screen to access a "Non-Financial (Legal) Information" screen shown in FIGS. 8 and 9. This screen provides access to the non-financial fields of the System. The Type field refers to the category of non-financial clause in the lease being abstracted. Examples of lease clause categories include Holdover, Recapture, Tenant Use, Termination, Relocation, Common Areas, and Tenant Expansion. In the Notes field, the abstractor provides a brief summary of the lease clause in layman's terms. For example, a typical Assignment & Subletting clause indicates whether the tenant is allowed to assign its interest in the lease or to sublet the whole or any part of the leased property, and whether the landlord's consent is necessary. This information is recorded in the Notes field in a clause summary prepared by the abstractor.

In order to provide a more accurate and complete summary of the lease clause, the abstractor may elect to drill down into the lease document, as previously discussed, by double-clicking within the Notes field to simultaneously display the exact text of the lease clause within a separate window, as shown in FIG. 8. From this single screen, the abstractor can readily prepare the clause summary by cutting and pasting relevant portions of the lease clause. The abstractor can also easily compare a previously prepared summary to the actual text of the lease.

The Status field of the "Non-Financial" screen records the current legal status of the particular non-financial clause. Possible status types include ACT (active), EXR (exercised), EXP (expired), or NOT (not exercised). The "active" status applies to a non-financial clause that is active and still operative. For example, if the lease grants to the tenant the right to assign the tenant's rights under the lease at any time, then this right will be active throughout the term of the lease. The "exercised" status applies to a non-financial clause that has been exercised. For example, if the lease grants the landlord the right to relocate the tenant one time during the term of the lease and the landlord has already relocated the tenant once during the term, then this clause has been exercised. The "expired" status applies to a non-financial clause that was only active for a certain amount of time, which time has now passed. For example, if the lease granted the tenant the right to terminate at the start of the third lease year, and the tenant is currently in the fourth lease year, then the status of this clause is expired. The "not exercised" status applies to a non-financial clause that either the landlord or the tenant chose not to exercise.

The Future Condition field records any restrictions placed on the exercise of the non-financial clause. Types of future conditions include MKT (market rate), M90 (90% of Market rate), M95 (95% of market rate), FIX (fixed rate), CON (contingent), and TXT (see text). "Market rate" status applies when the tenant is required to pay the market rate upon the exercise of the particular non-financial clause. For example, if the lease grants the tenant the right to expand its premises into a contiguous space at the market rate, the future condition would be MKT, or market rate. "90% of market rate" applies when the tenant is required to pay 90% of the market rate upon the exercise of the particular non-financial clause. "95% of market rate" applies when the tenant is required to pay 95% of the market rate upon the exercise of the particular non-financial clause. "Fixed rate" applies when the tenant is required to pay a fixed rate upon the exercise of the particular non-financial clause. "Contingent" applies to tenant restrictions, such as exclusives, radius, use and signage, where the non-financial clause will only take effect provided certain predetermined conditions occur first. If no available future conditions apply, the TXT option is selected with the future condition being explained in the Notes field.

Contacts

After abstracting the non-financial items of the lease, the abstractor clicks on the Back button to return to the "Lease Information" screen. From this screen, the abstractor selects the Contacts button to access the fields in the "Contacts for Lease" screen shown in FIG. 10. The lease contacts are the names and addresses of individuals material to the execution and administration of the lease.

The Contact Type field indicates the specific individual or entity associated with the tenant's lease. Contact types include the billing contact, tenant contact, landlord contact, guarantor contact, corporate contact, legal contact, broker contact, and other. The Contact Name field records the name of the entity to which correspondence directed to the contact should be addressed. The Contact Address fields are reserved for recording the address of each contact, and other such information including the contact's phone number, fax number, and web address. The Billing Contact field records the name of the individual to whom any correspondence directed to the contact should be addressed.

Lease Issues

Figure 11:
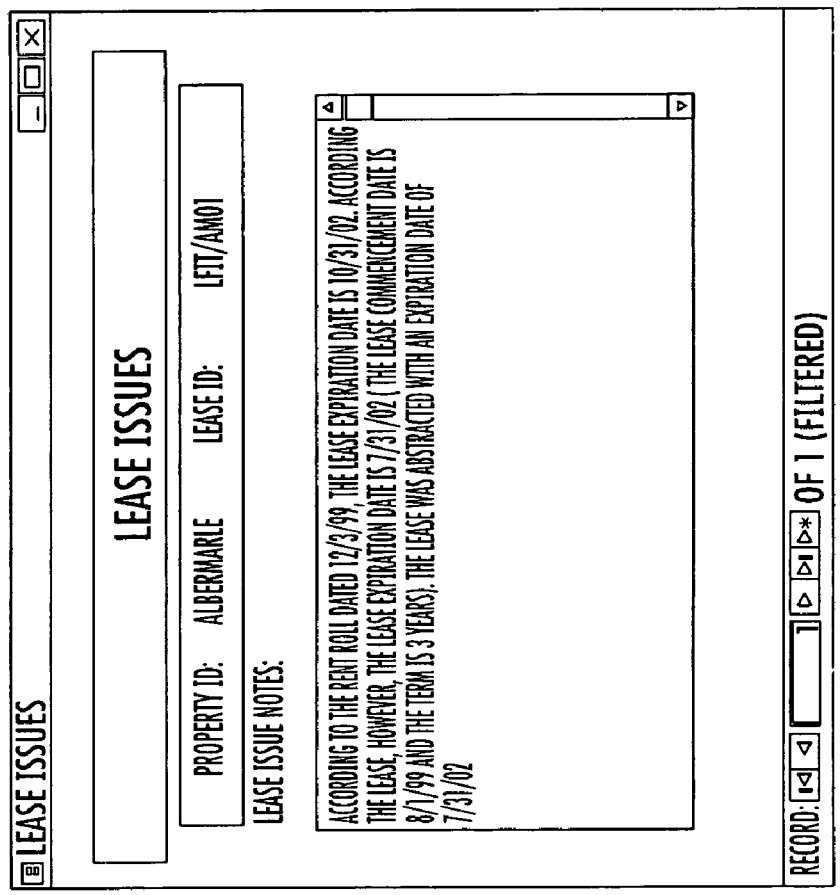
FIG. 11 is a print out of the "Lease Issues" screen.

After completing the contact information, the abstractor returns to the "Lease Information" screen and then selects the Lease Issues button to access the "Lease Issues" screen shown in FIG. 11. The Lease Issue Notes field is reserved for any miscellaneous or problem questions surrounding the lease that should be brought to the attention of the System user.

Renewal Option Detail

After recording any lease issues, the abstractor selects the "X" button to exit the "Lease Issues" screen and return to the "Lease Information" screen. From this screen, the abstractor clicks on the Renewal Options button to access the "Renewal Options Detail" screen shown in FIG. 12.

The Property ID and Lease ID fields in this screen are populated automatically using information previously entered into the System. The Status field refers to the current legal status of the particular non-financial record. Possible status types include ACT (active), EXR (exercised), EXP (expired), or NOT (not exercised), as previously described. The Future Condition field records any restrictions placed on the exercise of the non-financial clause. Types of future conditions include MKT (market rate), M90 (90% of Market rate), M95 (95% of market rate), FLX (fixed rate), CON (contingent), and TXT (see text).

The Type field records the specific type of option that the tenant has under the lease. Tenant either has an option to renew the lease term at some time in the future, or has exercised a past option to renew and is now in an extension term. An option is the right to renew or extend the term of the lease in the future. An extension represents an already-exercised option to extend the term of the lease beyond the natural expiration of the lease term. A renewal represents the extension of the Lease term through the execution of a whole new lease. An automatic renewal represents a lease that renews itself automatically. The lease term will generally continue automatically into extended terms unless the tenant notifies the landlord in advance of its intention to terminate the lease.

If the tenant holds an option to renew or extend the term of the lease, then the Notice field records the number of days prior to the end of the current lease term before which the tenant must notify the landlord of its desire to exercise the option. If the lease is one that renews automatically, then the Notice field records the number of days prior to the end of the current lease term before which the tenant must notify the landlord of its desire to terminate the lease. The Term field records the length of the tenant's option, renewal, extension, or automatic renewal period.

If the tenant holds an option to renew or extend the lease, then the Option Start Date field records the date on which the option period, if the option is exercised, is to begin. If the tenant holds an option to renew or extend the lease, then the Option End Date records the date on which the option period, if the option is exercised, is to end. If the tenant holds an option to renew or extend the term of the lease, then the Exercise Start Date records the very first date on which the tenant can exercise its option. The Exercise End Date field represents the very last day on which the tenant can exercise its option to renew or extend the term of the lease. If the tenant has an option to renew or extend the term of the lease, the Notify Start Date field records the date before which the landlord must notify the tenant about its option. The Respond End Date field records the date by which the tenant must respond to the landlord's notification. The Initial Min. Rent field records the amount of minimum rent that the tenant must pay at the commencement of the option period.

In the Option Rental Dates fields, the abstractor records the minimum rent for the entire period of the option, renewal, or extension term. The amount of minimum rent that tenant must pay at the commencement of the option period is recorded in the Effective Date field. If minimum rent during the option period increases at any time in the future, the date(s) of such increases are recorded in the subsequent Effective Date fields. The monthly amount of such increases is then recorded in the accompanying Monthly fields. The Per Sq. Ft. field records the amount of base rent that the tenant pays per square feet of the leased space. The Annual field records the amount of base rent that the tenant pays per year. These latter two fields are computed automatically upon entering the monthly amount of minimum rent.

The Ending Rental PSF button computes the amount of rent that the tenant must pay at the expiration of the natural term. This computation is made only when the future condition is market, 95% of market, or 90% of market. Any other fact pertinent to each option, renewal, or extension period is recorded in the Comments field.

Security Deposits

Figure 13:
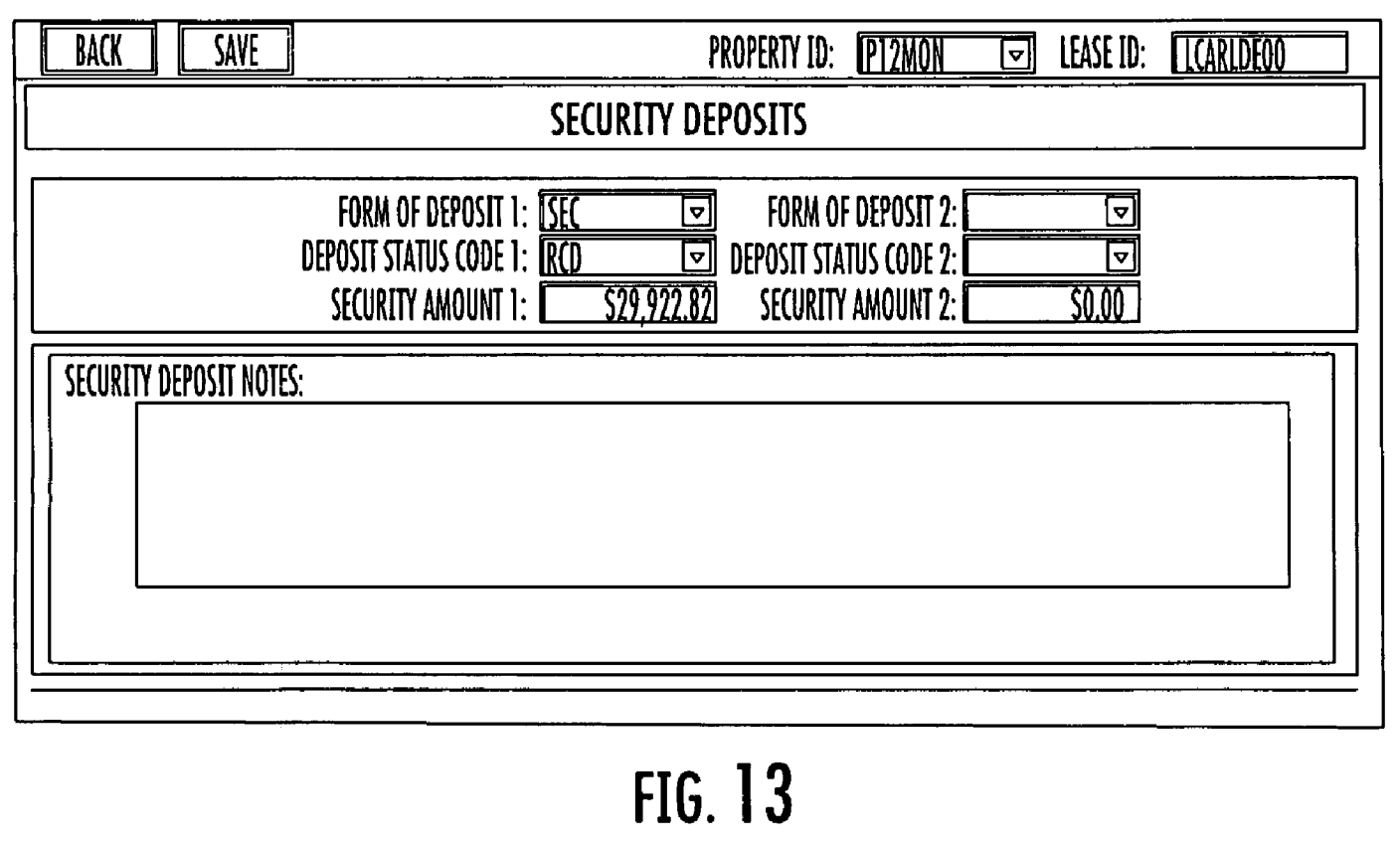

After abstracting the renewals for the lease and returning to the "Lease Information" screen, the abstractor selects the Security Deposits button to access the "Security Deposits" screen shown in FIG. 13.

The Form of Deposit field records the type of security deposit that tenant has deposited with landlord. Three common types of lease security deposits include SEC (security), LOC (letter of credit), and DCL (declining letter of credit). A "security" deposit is recorded if a cash security deposit used as security for the lease. A "letter of credit" deposit is recorded if a letter of credit used as security for the lease. A letter of credit is an engagement by a bank or other entity made at the request of the tenant stating that the issuer will honor drafts or other demands for payment upon compliance with specified conditions. A "declining letter of credit" is recorded for letters of credit that decline in value over the term of the lease. If there is more than one type of lease deposit (for example, the lease requires that the tenant pay half of the security deposit in cash and half of the security deposit in the form of a letter of credit), then the abstractor puts the first lease deposit type (cash) in the Form of Deposit 1 field and the second lease deposit type (letter of credit) in the Form of Deposit 2 field.

The Deposit Status Code field refers to the status of the tenant's lease deposit. Possible deposit status codes include DUE (due from tenant), EXP (letter of credit expired), REF (refunded), and RCD (received). The "due from tenant" status code applies if the landlord has not yet received the tenant's deposit. The "letter of credit expired" status code applies to leases that require a letter of credit or a declining letter of credit security deposit for which the letter of credit has expired and is of no further force or effect. The "refunded" status code applies to security deposits required by the lease that have been refunded to the tenant. The "received" status code indicates that the tenant's full security deposit has been received and is still valid. If there is more than one type of lease deposit, then the abstractor populates the Deposit Status Code fields for each type.

The Security Amount fields record the amount of the security deposit. In the Security Deposit Notes field, the abstractor indicates the specific section in the lease that defines the security deposit(s) and includes any unique language that describes landlord's use of the tenant's security deposit(s).

Late Fees/Estoppel

After entering the security deposits information, the abstractor clicks on the Back button to return to the "Lease Information" screen. From this screen, the abstractor selects the Late Fees/Estoppel button to access the "Late Fees/Estoppel" screen shown in FIG. 14.

The Late Fee Terms field records the payment terms of the lease, and more specifically, the payment of minimum rent and other charges, and the fees associated with the late payment of such charges. Examples of payment terms include NET, N05, N10, N15, N20, and N30. If the late fee terms according to the lease are "Net", then the tenant has no grace period for the payment of rent or other charges. In other words, the late fee begins to accrue on the very first day following the due date for such rent or other charge. If the terms are "N05", then the tenant has a 5-day grace period for late payments. If the tenant fails to pay rent or other charge within 5 days after the due date, then the late fee begins to accrue on the 6th day. If the terms are "N10", then the tenant has a 10-day grace period. If the terms are "N15", then the tenant has a 15-day grace period. If the terms are "N20", then the tenant has a 20-day grace period. If the terms are "N30", then the tenant has a 30-day grace period. In the Late Fee Notes field, the abstractor records the penalty that the tenant incurs for the late payment of rent, the penalty for a check returned for insufficient funds (NSF Fee), and any default interest.

The lease may require the tenant to execute, acknowledge, and deliver to the landlord, within a prescribed number of days, an estoppel certificate verifying that the lease is in full force and effect. In the Estoppel Required field, the abstractor records whether such a letter is ever required of the tenant. In the Estoppel Notes field, the abstractor explains when the tenant must deliver the estoppel letter, and any other relevant facts.

Lease Information Reporting

Once the lease is abstracted, as described above, subsequent users of the System can create any number of customized reports for leases stored in the System's central database. Conventional computer programming enables the System to group together various fields within a single lease record, or within multiple lease records for a single tenant, landlord, or property, or within multiple lease records for multiple tenants, landlords, or properties. Preferably, the database is accessible by multiple users via a global communications network, such as the Internet.

An electronic information management system for abstracting and reporting contract information is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. An electronic information management system for abstracting and reporting contract information contained in existing executed contacts, comprising:
   (a) a computer communicating with an electronic database;
   (b) an input device operatively connected to said computer for entering contract information into said database;
   (c) a plurality of electronic indexing tags at predetermined locations within the stored contract information and cooperating with a computer program to identify selected sections of the contract information;
   (d) a section summary comprising a customized reconstruction of the contact information in layman's terms chosen by an abstractor, said summary being prepared for an associated indexed contract section, and said summary being recorded in a field electronically linked to at least one of said indexing tags, whereby a user viewing said section summary can drill down into the stored contract information to retrieve the contract section corresponding to said at least one electronically linked indexing tag; and
   (e) a display device operatively connected to said computer for displaying said section summary and the corresponding contract section.

2. An electronic information management system according to claim 1, wherein said database comprises a plurality of contract abstracting fields adapted for being populated by the user based on data contained in the contract information.

3. An electronic information management system according to claim 2, wherein the contract information comprises a commercial real estate lease.

4. An electronic information management system according to claim 3, wherein said database comprises a plurality of separate electronic records containing a corresponding plurality of commercial real estate leases stored in said database.

5. An electronic information management system according to claim 4, wherein the data recorded in said contract abstracting fields is selected from a data group consisting of tenant identification, landlord identification, lease term dates, leased space information, landlord costs, minimum rent, recurring charges, percentage rent, non-financial, contacts, lease issues, renewal options, security deposits, late fees, and estoppels.

6. An electronic information management system according to claim 5, and comprising means for generating a customized report of data contained in selected ones of the contract abstracting fields.

7. An electronic information management system according to claim 1, wherein said section summary comprises a copied portion of the tagged section of contract information.

8. An electronic information management system according to claim 1, wherein said electronic database is accessible by multiple users at the same time via a global communications network.

9. An electronic information management process for abstracting and reporting contract information contained in existing executed contacts, said process comprising the steps of:
  (a) entering document information into an electronic database;
  (b) inserting a plurality of electronic indexing tags at predetermined locations within the stored document information, the indexing tags cooperating with a computer program to identify selected portions of the contract information;
  (c) preparing a section summary for an associated indexed contract section, the section summary being recorded in a field of the database, and comprising a customized reconstruction of the contract information in layman's terms chosen by an abstractor;
  (d) electronically linking the section summary field to at least one of the indexing tags, whereby a user viewing the section summary can drill down into the stored contract information to retrieve the contract section corresponding to the at least one electronically linked indexing tag; and
  (e) displaying to the user the section summary and the corresponding contract section.

10. An electronic information management process according to claim 9, and comprising the step of populating a plurality of contract abstracting fields of the database based on data contained in the contract information.

11. An electronic information management process according to claim 10, wherein the contract information comprises a commercial real estate lease.

12. An electronic information management process according to claim 11, and comprising the step of creating a plurality of separate electronic records for a corresponding plurality of commercial real estate leases stored in the database.

13. An electronic information management process according to claim 12, wherein the data recorded in the contract abstracting fields is selected from a data group consisting of tenant identification, landlord identification, lease term dates, leased space information, landlord costs, minimum rent, recurring charges, percentage rent, non-financial, contacts, lease issues, renewal options, security deposits, late fees, and estoppels.

14. An electronic information management process according to claim 13, and comprising the step of generating a customized report of data contained in selected ones of the contract abstracting fields.

15. An electronic information management process according to claim 9, and comprising the step of copying a portion of the tagged section of contract information into the section summary.

16. An electronic information management process according to claim 9, and comprising the step of making the electronic database accessible to multiple users via a global communications network.

* * * * *

UNITED STATES PATENT AND TRADEMARK OFFICE
CERTIFICATE OF CORRECTION

PATENT NO. : 7,047,491 B2
APPLICATION NO. : 09/730455
DATED : May 16, 2006
INVENTOR(S) : Daniel M. Schubert et al.

It is certified that error appears in the above-identified patent and that said Letters Patent is hereby corrected as shown below:

In column 20, lines 29-31 should read:

--1. An electronic information management system for abstracting and reporting contract information contained in existing executed contracts, comprising:--

In column 20, lines 41-42 should read:

--(d) a section summary comprising a customized reconstruction of the contract information in layman's terms--

In column 21, lines 18-21 should read:

--9. An electronic information management process for abstracting and reporting contract information contained in existing executed contracts, said process comprising the steps of:--

Signed and Sealed this

Third Day of July, 2007

JON W. DUDAS
*Director of the United States Patent and Trademark Office*